(12) United States Patent
Sachs et al.

(10) Patent No.: US 10,325,100 B2
(45) Date of Patent: Jun. 18, 2019

(54) METHOD AND DEVICE FOR VERIFYING A DATA DISPLAY IN A SECURITY-CRITICAL SYSTEM

(71) Applicant: Beckhoff Automation GmbH, Veri (DE)

(72) Inventors: Jens Sachs, Petershagen (DE); Martin Früchtl, Bad Sassendorf (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 0 days.

(21) Appl. No.: 14/542,784

(22) Filed: Nov. 17, 2014

(65) Prior Publication Data

US 2015/0074832 A1 Mar. 12, 2015

Related U.S. Application Data

(63) Continuation of application No. PCT/EP2013/059662, filed on May 8, 2013.

(30) Foreign Application Priority Data

May 21, 2012 (DE) .................. 10 2012 208 481

(51) Int. Cl.
*H04L 29/00* (2006.01)
*G06F 21/60* (2013.01)
*G06F 11/16* (2006.01)
*G06F 11/22* (2006.01)

(52) U.S. Cl.
CPC ............ *G06F 21/60* (2013.01); *G06F 11/162* (2013.01); *G06F 11/2221* (2013.01)

(58) Field of Classification Search
CPC .................................. G06Q 10/06; G02F 1/03

USPC ........................................................... 726/30
See application file for complete search history.

(56) References Cited

U.S. PATENT DOCUMENTS 8,145,914 B2 * 3/2012 Steeves .................... G06F 21/36
713/184
2012/0036081 A1 * 2/2012 Hatter ..................... G06Q 10/10
705/321

FOREIGN PATENT DOCUMENTS

| DE | 4332143 A1 | 3/1995 |
| EP | 0856792 A2 | 8/1998 |
| EP | 2189908 A1 | 5/2010 |
| EP | 2273369 A1 | 1/2011 |
| EP | 2405317 A1 | 1/2012 |

(Continued)

OTHER PUBLICATIONS

Abram Hindle, Michael Godfrey, Richard Holt, /Reverse Engineering CAPTCHAs/IEEEXplore/2008/pp. 60-68.*

(Continued)

*Primary Examiner* — Anthony D Brown
*Assistant Examiner* — Michael D Anderson
(74) *Attorney, Agent, or Firm* — Dorsey & Whitney LLP

(57) ABSTRACT

A method is described for operating a computer system comprising a computer and a display unit, wherein a reference pattern is formed based on input value fed into the computer, wherein image signals for the display unit are generated based on the input value, wherein the image signals fed to the display unit are detected, wherein the detected image signals are subjected to a pattern recognition to provide a recognized pattern, and wherein the recognized pattern is compared with the reference pattern.

19 Claims, 5 Drawing Sheets

(56) References Cited

FOREIGN PATENT DOCUMENTS

FR        2494471 A1    5/1982
WO    2011003872 A1    1/2011

OTHER PUBLICATIONS

Chinese Office Action for related application No. 201380038503.1, dated Aug. 13, 2015 (3 pages).
European Examination Report for related application No. 13720972.2, dated May 12, 2015.

* cited by examiner

METHOD AND DEVICE FOR VERIFYING A DATA DISPLAY IN A SECURITY-CRITICAL SYSTEM

CROSS-REFERENCE TO RELATED APPLICATIONS

This application is a continuation of International Patent Application No. PCT/EP2013/059662, filed May 8, 2013, which claims priority to German Patent Application No. DE 10 2012 208 481.9, filed May 21, 2012, each of which is incorporated by reference herein, in the entirety and for all purposes.

FIELD

The present invention relates to a method and to a device for operating a computer system. The invention further relates to a graphic editor.

BACKGROUND

EP 2 273 369 B1 discloses a method for displaying security-relevant information on a display device and a device for carrying out the method. The disclosed method comprises the step of entering at least one input value into a computing unit, the step of processing the input value with the help of computing in the computing unit to obtain an image-data sequence representing the input value, the step of forwarding the image-data sequence to a display device and the step of representing the image-data sequence on the display device, as well as the step of feeding the image data sequence into a check unit and the step of carrying out, by means of computing, a security check by generating a check code for the image data sequence, the step of comparing the check code with a plurality of comparison codes present in the check unit and the step of allocating the comparing code to be determined to a corresponding potential input value and comparing it to the input value in order to generate either a positive or a negative check result in the check unit in order to initiate a security-relevant reaction.

In this context, each comparing code corresponds to a pre-calculated CRC check sum based on a predetermined bitmap. This particularly means that for each possible bitmap, i.e. image data sequence, a valid CRC check sum is stored as a comparing code in the comparing unit.

A particular disadvantage of the disclosed method is that it works only if comparing codes corresponding to the entered values are stored in the check unit. If unknown input values are entered, this method will not work anymore. In addition, a minimal deviation of the entered input values, e.g. a different colour representation or another font size is sufficient in order to generate a check sum which differs from the stored check sum, resulting in an error report even if no error has occurred. Moreover, it has to be safeguarded when generating and storing the pre-calculated CRC check sums that these are correctly generated and stored.

EP 0 856 792 B1 discloses a method for safely representing an image on a monitor. In this context, two image memories which are independent from each other are provided, storing corresponding image data of an image to be displayed. Said image data are generated by means of an image processor and additionally stored in an image-retransmission buffer which drives the monitor. At specific points in time, the data from the individual memories are read out and compared to one another.

DE 43 32 143 A1 discloses a method for operating a data-display unit and units for carrying out the method. In analogy to patent specification EP 0 856 792 B1, two image memories are generated in this context wherein check sums are generated based on the data stored in the image memories. At specific points in time, these check sums are compared to one another.

The particular disadvantages of these two disclosed methods are that two image memories are required for carrying out the methods, thus requiring more material and increasing a complexity of a corresponding configuration.

EP 2 405 317 A1 discloses a method for safe parametrisation of a security device. The method comprises the steps of inserting a parameter value into a configuration unit by a user and displaying the parameter value on a display unit. The method further comprises the method steps of encrypting the parameter value in the configuration unit and of storing at least one feature resulting from the encryption. Upon verification by means of the feature, the parameter value is displayed on the display unit for a second time, the second display being timely and spatially correlated with the first display. The next step is a value comparison by the user of the parameter value represented by means of the two displays, and confirmation of a valid parameter indication if a correlation is determined. The next step is read-back-free reading out of validly entered parameter values from the configuration unit into the security device.

A disadvantage is that the verification of the entered and represented parameter values is exclusively carried out by means of visual examination on behalf of user.

SUMMARY

The present invention provides an improved method and device for operating a computer system and an improved graphic editor.

According to an aspect, a method for operating a computer system comprising a computer and a display unit is provided, wherein a reference pattern is formed based on input values fed into the computer, wherein image signals for the display unit are generated based on the input value, wherein the image signals fed to the display unit are detected, wherein the detected image signals are subjected to a pattern recognition to provide a recognized pattern, and wherein the recognized pattern is compared with the reference pattern.

According to a further aspect, a device for operating a computer system comprises a computer and a display unit. The computer is configured to form image signals based on input values fed into the computer for the display unit for displaying the input value and to output it to the display unit. The device comprises a reference pattern unit for forming a reference pattern based on the input values fed to the computer, a signal-detecting unit for detecting the image signals outputted from the computer to the display unit, a pattern-recognition unit connected to the signal-detection unit for subjecting the detected image signals to a pattern recognition and a comparing unit connected to the reference-pattern unit and the pattern-recognition unit for comparing a pattern recognized by means of the pattern-recognition unit to the reference pattern.

According to a further aspect, a graphic editor comprises input values in the form of graphic commands and connections being established between input values, each input value being provided with a characteristic, at least a reference pattern being configured on the basis of input values with their assigned characteristics and the corresponding connections, image signals based on the input values, so that input values can be visually displayed by means of a display unit, said image signals being subjected to a pattern recognition to provide a recognized pattern, and a comparison unit for comparing the reference pattern and the recognized pattern.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
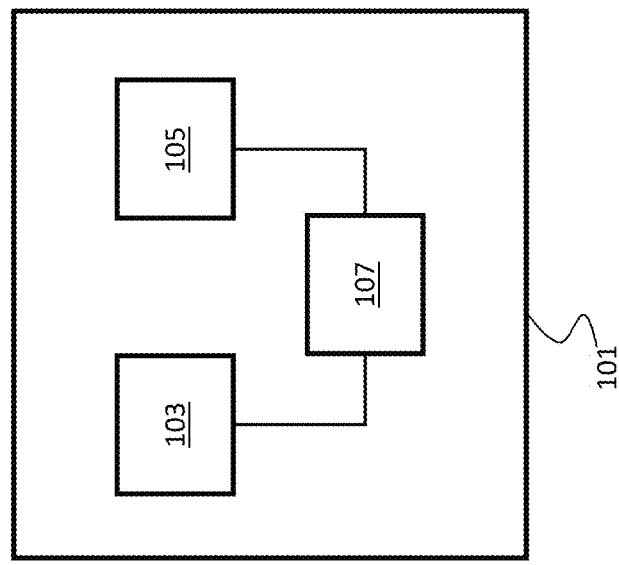
FIG. 1 shows a device for operating a computer system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In the following, the same reference numerals may be used for the same features.

FIG. 1 shows a device 101 for operating a computer comprising a computer and a display unit. The device 101 comprises a reference-pattern unit 103 for generating a reference pattern based on an input value fed into the computer. Furthermore, a pattern-recognition unit 105 is provided which is configured to carry out pattern recognition on image signals generated on the basis of the entered input value for the display unit for displaying the input value. Moreover, the device 101 comprises a comparing unit 107 for comparing a pattern recognized by means of the pattern-recognition unit 105 to the reference pattern.

Figure 2:
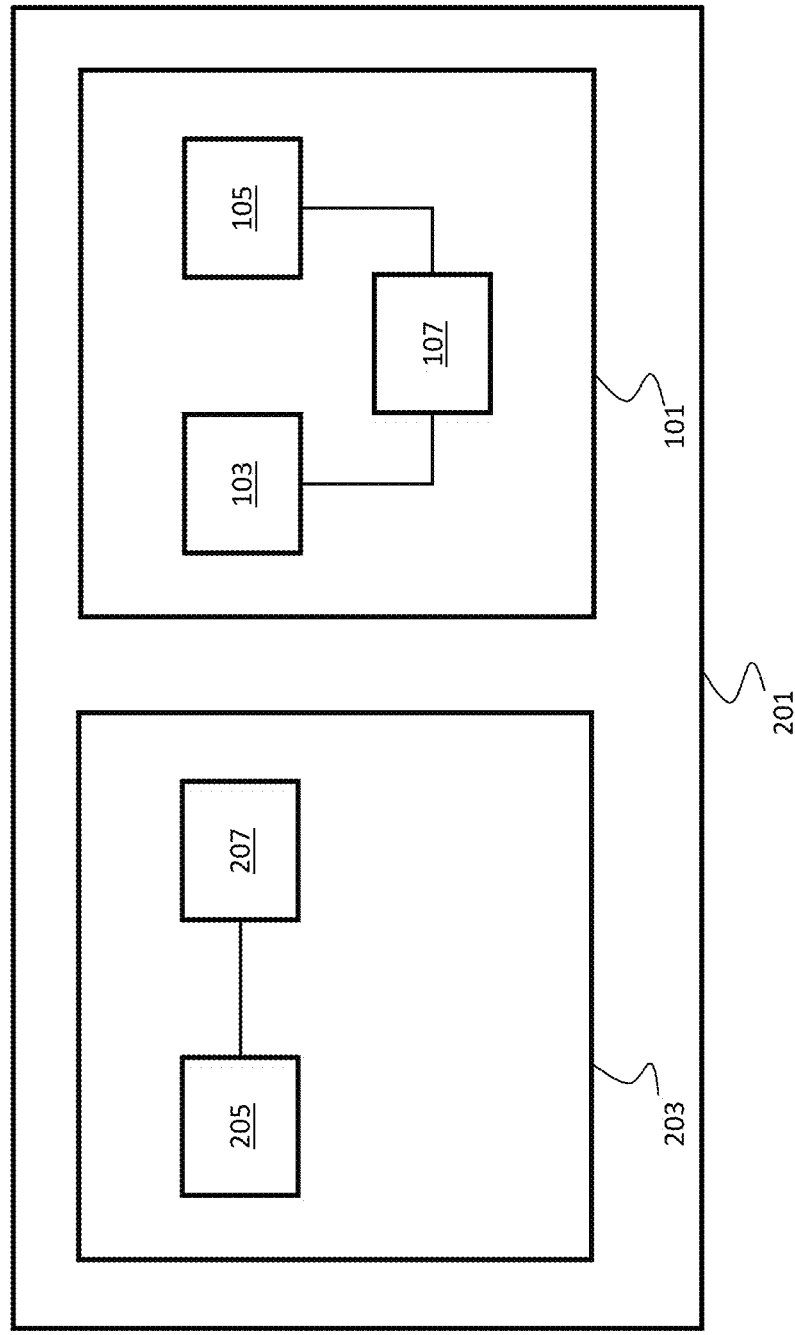
FIG. 2 depicts a system.

FIG. 2 shows a system 201. The system 201 comprises a computer system 203 with a computer 205 and a display unit 207. Furthermore, the system 201 comprises the device 101 of FIG. 1.

An input value entered into the computer 205 is fed into the reference-pattern unit 103 so that it may generate a reference pattern based on the input value. Image signals generated on the basis of the entered input value are fed into the display unit 207 so that it may display or, respectively, represent the entered input value based on the image signals. Said image signals are also fed into the pattern-recognition unit 105 so that it may carry out pattern recognition on the image signals. The pattern(s) recognized by means of the pattern recognition is/are then fed to the comparing unit 107. Moreover, the reference pattern is fed to the comparing unit 107 so that the comparing unit 107 may compare the reference pattern to the recognized pattern(s).

If the comparison results in that the reference pattern does not correspond to at least one of the recognized patterns, it may e.g. be provided that a warning is issued and/or (a) security-relevant action(s) is/are carried out.

In one embodiment, it may be provided that the device 101 is integrated in the computer 205. In another embodiment, it may be provided that only a few elements of the device 101 such as the reference-pattern unit 103 and/or the comparing unit 107 and/or the pattern-recognition unit 105 are integrated in the computer 205. In another embodiment, it may be provided that the pattern-recognition unit is integrated in the display unit 207.

In an embodiment, it may be provided that the comparing unit 107 is configured in the pattern-recognition unit 105. This particularly means that the pattern-recognition unit 105 may carry out pattern recognition as well as a comparison of the recognized patterns to the reference pattern.

In a further embodiment, a signal-detection unit for detecting image signals may be provided, said signal-detection unit being connected to the pattern-recognition unit 105. Thus, this particularly means that the signal-detecting unit detects image signals and sends these to the pattern-recognition unit 105 for pattern recognition. Preferably, it may be provided that the signal-detection unit is integrated into the display unit 207. Preferably, it may be provided that the signal-detecting unit is configured to detect the control signals and to send them to the pattern-recognition unit 105. Preferably, the signal-detecting unit may be configured to detect the status values or, respectively, the status parameters.

Figure 3:
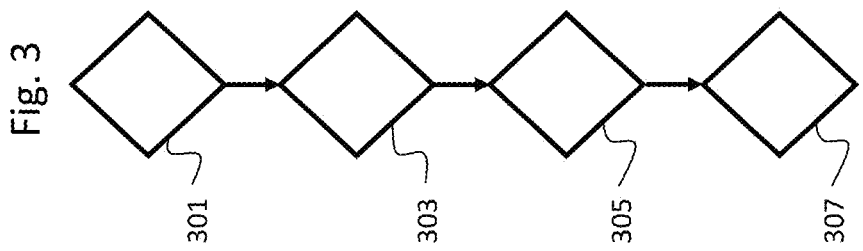
FIG. 3 depicts a flow chart of a method for operating a computer system.

FIG. 3 shows a flow chart of a method for operating a computer system, the computer system comprising a computer and a display unit.

According to a step 301, image signals are generated, said generating being based on an input value fed to the computer. The image signals are intended for the display unit so that it may display the entered input value based on the image signals.

According to step 303, a reference pattern is generated based on the entered input value.

According to step 305, the image signals are subjected to pattern recognition wherein in accordance with a step 307 a pattern recognized by means of the pattern recognition is compared to a reference pattern.

Thus, it may advantageously be guaranteed that the entered input value corresponds to the actually displayed input value. For example, a difference may exist between the entered input value and the displayed input value which is so minimal that a user or, respectively, an operator does not recognize this difference. For example, the user may input the variable name "Varinput12", however, the variable name "Varinput21" is displayed. This difference, which is minimal for the user and difficult to recognize is inventively detected in an advantageous and fully automated manner without requiring a separate database for this purpose which contains check sums calculated prior to the input of the input values which, in addition, would have to be verified with regard to correctness in a complex manner. It is furthermore possible to verify the correct display of any desired entered input values. In the prior art, however, it is only possible to reliably verify such entered input values which are already present in the database. Thus, in the prior art, a statistical determination is carried out with regard to the check sums stored in the database at the point of time of the compilation of the database.

Figure 4:
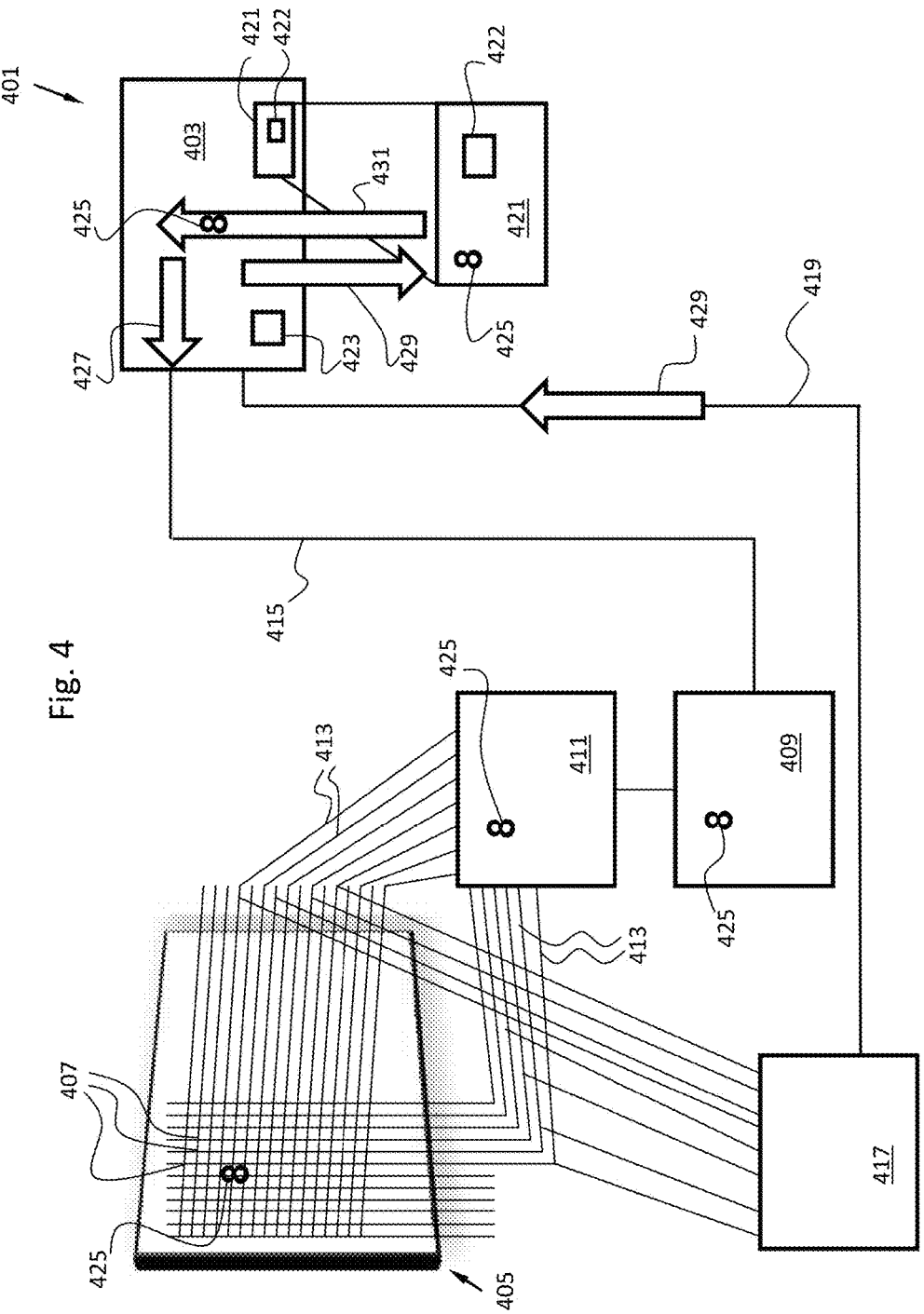
FIG. 4 shows a further system.

FIG. 4 shows a further system 401. The system 401 comprises a computer 403 and a display unit 405 which form a computer system.

The display unit 405 comprises pixel elements 407 which are symbolically represented as the crosspoints of crossed lines. Such a structure of pixel elements 407 may also be referred to as a pixel structure or as a pixel matrix.

The display unit 405 further comprises a scaling tool 409 and a processing unit 411 which may generate control signals for accessing the pixel elements 407 on the basis of image signals. Said control signals are sent or, respectively, transmitted to the pixel elements 407 by means of control-signal lines 413.

The image signals on which the control signals are based are transmitted to the scaling tool 409 by the computer 403 via an image-signal line 415. Herein, it may be provided that the image-signal line 415 is configured as a wireless signal line or a cable-based signal line. Thus, a cable-based or a wireless transmission of the image signals is carried out. Preferably, both forms of transmission, i.e. cable-based or wireless, may be provided. In this case, a corresponding signal line is preferably provided.

The corresponding image signals transmitted via the image-signal line 415 are in the computer 403 configured by means of an image-signal generator, particularly a graphic card. As an image signal, the image-signal generator may e.g. provide an RGB signal and/or an HDMI signal and/or a DVI signal and/or a display-port signal. "RGB" stands for "red, green, blue". "HDMI" means "high definition multimedia interface". "DVI" signifies "digital visual interface". The image-signal generator preferably comprises corresponding signal outputs to which e.g. corresponding matching image-signal lines may be connected.

Furthermore, a detection unit 417 may be provided which may detect control signals and particularly retrieve them from the control-signal lines 413. In this context, it may be provided that the detection unit 417 retrieves corresponding status values or, respectively, status parameters of the pixel elements 407 from the control signals, wherein this query may preferably be initiated by the computer 403.

The control signals or, respectively, the status values retrieved by means of the detection unit 417 are then sent to the computer 403 via a connection 419, e.g. an Ethernet connection, a WiFi connection and/or a mobile cellular connection. Preferably, communication may be carried out in an encrypted manner.

In the computer 403, a pattern-recognition unit 421 comprising a comparing unit 422 is provided which, in an embodiment, may also be configured externally, i.e. separately, from the pattern-recognition unit 421. Symbolically shown is the pattern-recognition unit 421 comprising the comparing unit 422 in the computer 403 as well as, in an enlarged illustration, a configuration external from the computer 403. Both arrangement options, external and internal, may be provided simultaneously, e.g. in the case of two or several comparing units, or individually.

The pattern-recognition unit 421 subjects the control signals and/or the status parameters to pattern recognition, the control signals and/or the status parameters then being forwarded to the computer 403 by means of the detection unit 417. These transmitted control signals and/or status parameters are herein shown symbolically by means of an arrow having reference numeral 429.

Moreover, a figure eight (8) is symbolically depicted having reference numeral 425. The correspondingly generated image signals are herein designated by reference numeral 427, the image signals 427 then being transmitted to the scaling tool 409 for further processing for visually displaying the eight by means of the pixel element 407.

In the arrow with reference numeral 429, this input value—eight—is not yet depicted since the re-transmitted control signals or, respectively, status parameters are not yet subjected to the pattern recognition. The eight as an input value 425 is not depicted until the illustration with the arrow having reference numeral 431, since in this depiction, a corresponding pattern recognition by means of the pattern-recognition unit 421 has been performed.

In an embodiment, it may be provided that the element with reference numeral 417 is configured as a pattern-recognition unit comprising a detection unit. Thus, this particularly means that in this embodiment example, pattern recognition is applied to the corresponding signals externally from the computer 403. The recognized patterns are then transmitted to the computer 403 via the connection 419. Inside of the computer 403, the comparing circuit 422 may perform a comparison between the recognized patterns and the reference pattern, whereby the comparing circuit 422 may preferably be arranged externally from the computer 403.

Figure 5:
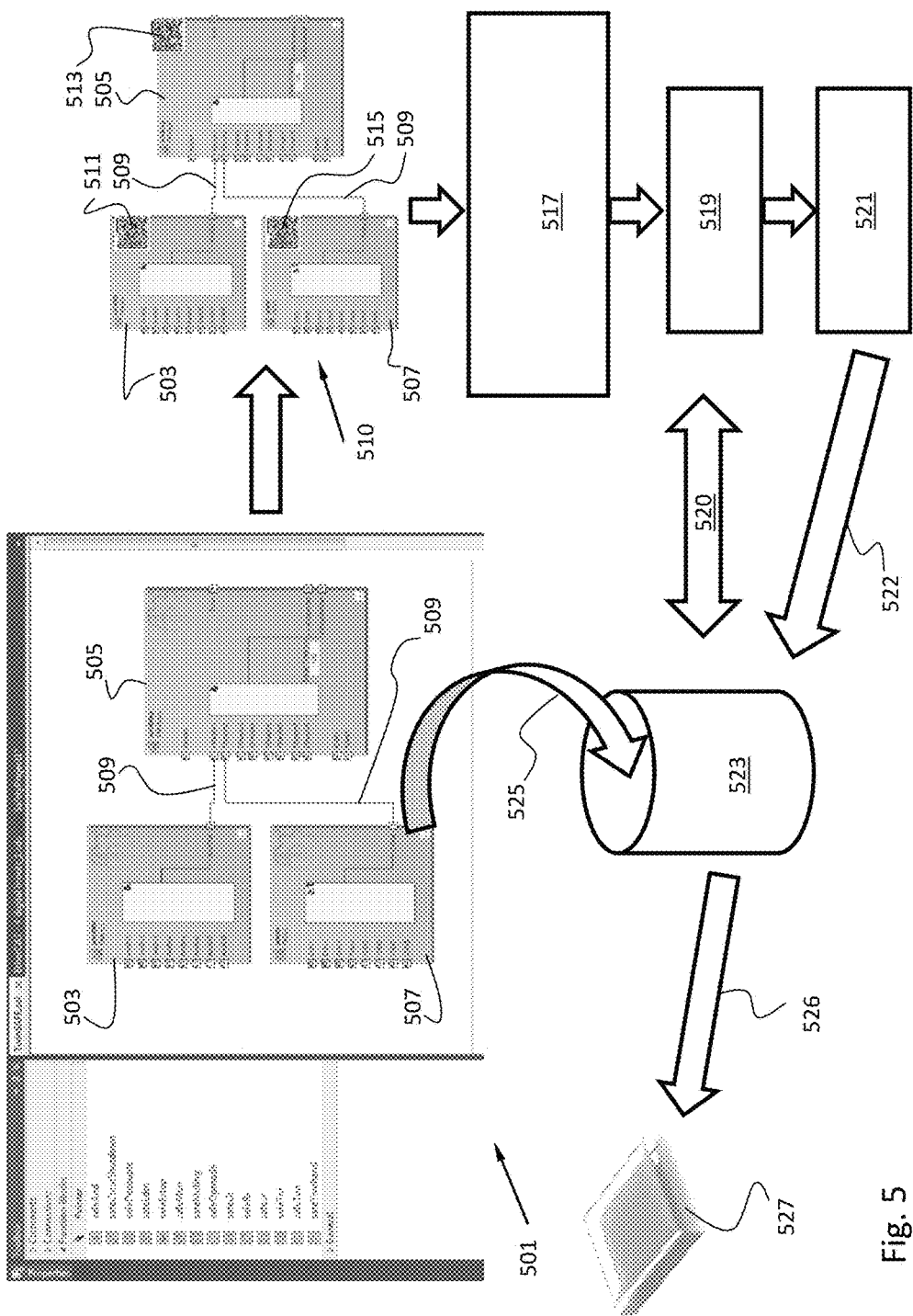
FIG. 5 shows a graphic interface of a graphic editor.

FIG. 5 inter alia shows a graphic interface of a graphic editor in order to e.g. devise a computer program by means of graphic elements representing e.g. commands and/or variables which may be executed upon compilation. FIG. 5 exemplarily shows input values in the form of graphic commands 503, 505 and 507. Here, connections 509 are established between input values 503 and 507 and input value 505.

According to a step 510, input values 503, 505 and 507 are provided with a characteristic 511, 513, 515, characteristics 511, 513, 515 being in the form of a data-matrix code. In an embodiment, it may be provided that instead of or in addition to the data-matrix codes, a further barcode and/or a predetermined graphic element are used.

In step 510, reference patterns are furthermore generated respectively based on the input values 503, 505 and 507 together with their assigned characteristics, and based on the connections 509. It may preferably be provided that one single reference pattern is configured on the basis of three input values 503, 505 and 507 with their assigned characteristics and the corresponding connections 509.

The graphic interface of the graphical editor 501 is usually displayed by means of a display unit. The graphical editor 501 is usually operated by means of a computer so that inputs or, respectively, input values for the graphic editor 501 are fed to the computer. Based on the input values 503, 505 and 507, corresponding image signals are generated for the display unit so that input values 503, 505 and 507 can be visually displayed by means of the display unit. Said image signals are used for pattern recognition. This particularly means that this image signal is subjected to a pattern recognition which is herein exemplarily represented by means of a rectangle having reference numeral 517. According to this step 517, the image signals are thus subjected to pattern recognition. In this context, one or several patterns are usually recognized.

Subsequently, according to step 519, a comparison is carried out between the recognized patterns and the reference pattern(s). In this context, it may be provided that the reference pattern(s) generated in step 510 is/are stored in a memory 523. A double arrow having reference numeral 520 symbolically depicts the exchange of correspondingly stored data between the memory 523 and a comparing unit which is configured to carry out step 519.

After determining in step 519 that the recognized pattern(s) correspond(s) to the reference pattern(s), a second check sum is formed on the basis of the recognized patters in accordance with a step 521. The check sum 521 is stored in a memory 523, which is in this context symbolically shown by an arrow having reference numeral.

Furthermore, it may be provided that a first check sum is generated based on the entered input value, i.e. herein based on input values 503, 505 and 507 with connections 509 which are stored in memory 523, as well, particularly if the recognized patterns correspond to the reference patterns. Here, said storing is symbolically characterized by means of an arrow having reference numeral 525. In an embodiment, the first check sum may be generated based on the entered input values stored in the memory 523. Preferably, a respective first check sum may be calculated or, respectively, generated for each entered input value or, respectively, for each stored and entered input value.

The data stored in memory 523, i.e. particularly the first and the second check sum are transmitted to a further comparing unit 527. Said transmittal is herein depicted by means of the arrow having reference numeral 526.

The further comparing unit 527 particularly examines whether the two check sums correspond to each other. Thus, in an advantageous manner, a further verification takes place whether the entered input values 503, 505 and 507 with their connections 509 are displayed correctly. Even if e.g. systematic errors occur, the further comparing unit 527 may still reliably detect a deviation or, respectively, a non-match. This advantageously results in a considerable gain in security.

A method for operating a computer system is provided which allows for verifying an input value displayed on a display unit as to whether the displayed input value corresponds to the input value fed into the computer. The computer system comprises a computer and a display unit. Based on an input value fed into the computer, image signals for the display unit for displaying the input value are generated. Furthermore, a reference pattern is generated based on the fed-in input value. The image signals are subjected to a pattern-recognition routine, wherein a pattern recognized in this routine is compared to the reference pattern. Preferably, it may be provided that the method on is carried out by the computer itself. Particularly, all steps or some of the steps or only one step of the method may be executed by means of the computer.

Further, a device for operating a computer system is provided. The computer system comprises a computer and a display unit. The device comprises a reference-pattern unit in order to generate a reference pattern based on an input value fed into the computer. Furthermore, a pattern-recognition unit for applying pattern recognition to image signals based on the input value is generated for the display unit in order to display the input value. The device furthermore comprises a comparing unit for comparing a pattern recognized by means of the pattern-recognition unit to the reference pattern. Hence, the device is particularly equipped or, respectively, configured to carry out the method. Preferably, the device is integrated in the computer. Preferably, some elements of the device are integrated in the computer. Other elements of the device may e.g. be configured externally from the computer.

According to a further aspect, a system is provided. The system comprises a computer system with a computer and a display unit. Moreover, the system comprises the device for operating a computer system.

According to yet another aspect, a computer program is provided which comprises program code for executing the method for operating a computer system comprising a computer and a display unit, if the computer program is executed on a computer.

Thus, the idea is that image signals for a display unit are subjected to pattern recognition. By means of the pattern recognition, one or a plurality of patterns may be recognized in the image signals in an advantageous manner. When recognizing one or a plurality of patterns in the image signals, a comparison between the recognized pattern or, respectively, the recognized patterns and a reference pattern takes place. It is proposed that this reference pattern is generated based on an input value fed into the computer, this input value being used as a basis for generating the image signals.

By using the fed-in input value as a basis for the reference pattern, the necessity of a memory containing pre-determined comparing codes which, as described in EP 2 273 369 B1, have to be determined or, respectively, calculated in a complex manner at an earlier point in time prior to the execution of the method can be omitted. Even various deviations, e.g. a different colour or a different font size by means of the inventive method advantageously no longer lead to false alarms since said deviations are directly taken into account during generation of the reference pattern. The reference pattern is generated based on the fed-in input value during runtime.

In this context, runtime particularly means the time span or, respectively, the time interval of the execution of the method or, respectively, of the computer program or, respectively, of the operation of the device or, respectively, of the system. The runtime thus particularly refers to the time in which the method or, respectively, the computer program is carried out. Hence, the runtime particularly refers to the time in which the device or, respectively, the system is active.

A further particular advantage is that a verification if the fed-in input value really corresponds to the displayed input value, may be carried out automatically and without errors by the system or, respectively, by the device itself. A visual examination by the user, as in publication EP 2 405 317 A1, is not required. Moreover, it is not necessary to provide a plurality of image memories, advantageously resulting in saving material.

An input value within the scope of the present invention may e.g. be a letter and/or a number. An input value of the present invention may e.g. comprise a sequence of letters and/or a sequence of numbers, wherein these may be provided in a mixed form. Preferably, the input value comprises a command and/or a parameter in a computer language such as C, C++, Fortran, Java, Javascript, Visual Basic, Python, C#, JPython, Pearl, PHP, SQL. The input value may preferably be a graphic element such as a graphic command of a graphic computer language. An input value within the scope of the present invention may e.g. be a combination of such graphic elements and/or graphic commands. The mentioned examples of computer languages are not to be understood in a limiting way. The invention is not meant to be limited to the mentioned computer languages but may be applied to any desired computer language.

Feeding an input value into the computer particularly comprises detecting a user input into the computer. An input value fed into the computer by a user may e.g. be referred to as an entered input value. A user input may e.g. be detected by means of a keyboard. Preferably, a user input may be detected by means of sensors. Such sensors may e.g. comprise optical, acoustical and/or tactile sensors. Feeding in the input value into the computer preferably comprises sending the input value to the computer. Sending may preferably be executed by means of a cable-less or, respectively, wireless connection and/or by means of a cable-connection, i.e. in a cable-based manner. Cable-less connections may e.g. comprise WiFi, Bluetooth, cellular mobile and/or infrared connections. Cable-based connections may e.g. comprise Ethernet connections.

Pattern recognition within the scope of the present invention particularly refers to a method for recognizing regularities and/or repetitions and/or similarities and/or principles in an amount of signals, herein image signals, or, respectively, data. From said regularities, repetitions, similarities and/or principles, the recognized pattern(s) is/are preferably generated.

Image signals within the scope of the present invention particularly comprise information on the display unit which enable it to display the entered input values, i.e. to represent them visually.

According to an embodiment, it may be provided that the entered input value is allocated a characteristic, the image signals and the reference pattern being generated on the basis of the entered input value having the assigned characteristic. Thereby, the pattern recognition may preferably be carried out more efficiently and more effectively, since during pattern recognition the characteristic may specifically be scanned since the characteristic usually provides a unique and previously known signal. A potential error rate of the pattern recognition may thus be reduced or, respectively, avoided in a preferable manner. Moreover, a computing power required for pattern recognition may in this way be reduced in an advantageous manner, thus resulting in a saving of energy. Furthermore, in an advantageous manner, the pattern recognition may e.g. be carried out on more less powerfully configured processors. In particular, a plurality of characteristics may be provided. The characteristics may be e.g. configured equivalently or differently.

According to another embodiment, it may be provided that the characteristic comprises a barcode. Preferably, the barcode may be configured as a data-matrix code. In particular, a plurality of barcodes may be provided. The barcodes may be configured equivalently or differently.

A barcode within the scope of the present invention particularly refers to an opto-electronically readable font which comprises lines of different widths which are preferably parallel and spaced apart with gaps provided between the lines. The barcode may preferably be configured as a 1D or 2D barcode, "D" standing for dimension. In a 1D barcode, i.e. a 1-dimensional barcode, the data are encoded in one direction. In case of a two-dimensional barcode, i.e. a 2D barcode, the data are encoded as a plane across two dimensions, i.e. in two directions. A data-matrix code is an example of a 2D bar-code.

According to a further embodiment, the characteristic may be provided as comprising a graphic element. Such an element may e.g. be any desired geometrical shape such as a circle, a rectangle, a triangle or a hexagon. The aforementioned geometrical shapes are to be understood as examples, not, however, as limitations.

According to another embodiment, the characteristic may be provided to be embedded into the image signals as a steganographic element. A steganographic element within the scope of the present invention particularly refers to an element which is embedded into the image signals by means of a stegangraphic method. Hence, by means of a steganographic method, the characteristic is embedded into the image signals. Here, the image signals particularly act as carrier signals in which the characteristic or, respectively, the corresponding characteristic signals may hide. In particular, a steganographic method advantageously allows for embedding the characteristic into the image signals without changing a display of the input value corresponding to the image signals for this purpose so that the presence of the characteristic in the input value or, respectively, the corresponding allocation is usually not noticed by a user who e.g. entered the input value.

According to another embodiment, it may be provided that, if the recognized pattern corresponds to the reference pattern, a first check sum is generated based on the entered input value and a second check sum is generated based on the recognized pattern, which are then compared to each other. Thereby, in an advantageous manner a second examination takes place as to whether the entered input value corresponds to the displayed input value. If this is the case, the two check sums are usually equal. If, however, the entered input value does not correspond to the displayed input value, said two check sums usually deviate from each other. Even if a systematic error was to occur in the pattern recognition, e.g. resulting in a recognized pattern being erroneously, i.e. faultly being recognized as a reference pattern, this systematic error will be detected when comparing the two check sums to each other, so that corresponding measures such as issuing a warning could be taken.

According to a further embodiment, it may be provided that the image signals comprise control signals for accessing pixel elements of the display unit, the pattern recognition being applied to the control signals. Usually image signals which are sent to the display unit are processed by it to obtain control signals in order to e.g. be able to access the individual pixel elements of the display device in accordance with the control signals. Herein, it is inventively proposed to apply pattern recognition to these control signals. Hence, since image signals are used for the pattern recognition which are generated at the end of the computer-display-unit chain, the possibility of further system-inherent errors occurring does not exist anymore. Thereby, in an advantageous manner, the probability that a statement on whether the entered input value in fact corresponds to the displayed input value is correct is considerably increased further.

In a further embodiment it may be provided that corresponding status values or, respectively, status parameters of the pixel elements are retrieved from the control signals, e.g. by means of the computer, pattern recognition being applied to the status values or, respectively, to the status parameters. The pattern recognition is in this context applied to the image signals in a mediate manner as the image signals comprise the control signals for accessing the pixel elements, wherein the pixel elements in the control signals switch to corresponding states or, respectively, are operated in accordance with the control signals. One state may e.g. be a "permeable state", in which the pixel element is transparent. Another state may e.g. an "impermeable state" in which the pixel element is opaque, i.e. non-transparent. Other states may e.g. be intermediate states between the two states "permeable" and "impermeable state". By actively querying, particularly by means of the computer, unnecessary transmission of signals or, respectively, executing pattern recognition is advantageously avoided which e.g. efficiently uses an existing transmission bandwidth, preferably a transmission bandwidth of a computer-display-unit connection.

The detection of control signals and/or of status values or, respectively, status parameters of the pixel elements may particularly be referred to as performing a monitor copy, usually referred to by the term "screen shot".

According to another embodiment, it may be provided that an allocation unit for assigning a characteristic to the entered input value is configured, wherein the reference-pattern unit for forming the reference pattern based on the entered input value is configured with the assigned characteristic. This particularly means that the image signals are in this context generated on the basis of the entered input value with the assigned characteristic. The pattern-recognition unit thus particularly applies the pattern recognition to the corresponding image signals.

In another embodiment, a check-sum generator for generating a first check sum based on the entered input value, particularly comprising the assigned characteristic, and for generating a second check sum based on the recognized pattern if the recognized pattern corresponds to the reference pattern, is provided, a further comparing unit being provided for comparing the first check sum to the second check sum.

According to a further embodiment, it may be provided that the pattern-recognition unit is configured or, respectively, arranged in the display unit for applying the pattern recognition to the control signals comprised by the image signals in order to access the pixel elements of the display unit.

In a further embodiment, a signal-detection unit for detecting image signals and/or for detecting control signals and/or status parameters may be provided which is connected to the pattern-recognition unit. This particularly means that the signal-detection unit only detects image signals and sends them to the pattern-recognition unit in order to carry out pattern recognition. The signal-detection unit may in the following also be referred to as detection unit. Preferably, the signal-detection unit may be integrated or, respectively, arranged in the display unit. Thus, it may in an advantageous manner particularly comprise the control signals and/or the status parameters. It may preferably be provided that the signal-detection unit is configured to detect the control signals and to send them to the pattern-recognition unit. It may preferably be provided that the signal-detection unit is configured to detect the status values or, respectively, the status parameters. The signal-detection unit is preferably configured to detect the control signals and/or the status parameters depending on a query from the computer and to send them to the pattern-recognition unit.

It may preferably be provided that a cable-based connection and/or a cable-less connection is configured between the signal-detection unit and the pattern-recognition unit. In a most general sense, a cable-based connection may comprise e.g. an Ethernet connection, preferably a gigabit Ethernet connection. In a most general sense, a cable-less connection may in particular comprise a WiFi, infrared, cellular mobile and/or a Bluetooth connection.

In a further embodiment, it may be provided that the signal-detection unit for detecting image signals connected to the pattern-recognition unit is configured between an image-signal output of an image-signal generator and an image-signal input of the display unit. The image-signal generator is preferably configured to form corresponding image signals based on the entered input value for the display unit.

Such an image-signal generator may e.g. comprise a graphic chip or, respectively, be configured such. Such a graphic chip may e.g. be comprised by a graphic card. The image-signal generator may preferably be configured as a graphic card. The image-signal generator may e.g. be arranged within the computer. Preferably, the image-signal generator may be arranged externally from the computer.

According to another embodiment, it may be provided that the entered input value is stored the reference pattern and the image signals being generated based on the stored entered input value. Thus, it can be safeguarded in an advantageous manner that a stored input value which is typically used as a basis for further processing steps in the computer is displayed correctly and that no errors occur when storing the entered input value which might lead to a modified input value. In other words, in this context it may preferably be provided that what is visually displayed by the display unit, i.e. for example commands of a computer language, parameters, letters numbers, graphic elements or graphic commands of a graphic computer language is compared to the content, i.e. data stored in a memory, wherein said content is based on the entered input values or, respectively, is to correspond to the entered input values if no errors have occurred.

According to another embodiment, it may be provided that a plurality of signal-detection units are configured. For example, a signal-detection unit may be provided between the image-signal output of the image-signal generator and the image-signal input of the display unit. In particular, a further signal-detection unit may be provided in the display unit in order to detect the control signals and/or the status parameters.

The invention claimed is:

1. A method for operating a computer system comprising a computer and a display unit,
   the computer comprising a graphic editor generating a computer program executable upon compilation, the graphic editor using graphic elements of a computer language, the graphic elements representing commands,
   wherein an input value comprising a graphic element representing a command in the computer language is entered into the computer,
   wherein a reference pattern is formed by the computer based on the input value comprising the command,
   wherein image signals for the display unit are generated by the computer based on the input value, the image signals depicting the input value comprising the command on the display unit,
   wherein the image signals forwarded from the computer to the display unit are detected and fed into a pattern recognition unit, wherein the detected image signals are subjected to pattern recognition to provide a recognized pattern,
   wherein the recognized pattern is compared with the reference pattern to determine whether the input value depicted on the display unit corresponds to the input value fed into the computer,
   wherein if the reference pattern does not correspond to at least one such recognized pattern, a warning is issued or a security-relevant action is carried out, and wherein the entered input value is allocated a characteristic and the image signals and the reference pattern are generated on the basis of the entered input value having the assigned characteristic.

2. The method of claim 1, wherein the image signals comprise information on the display unit which enable it to display the entered input value visually.

3. The method of claim 1, wherein the pattern recognition is configured to recognize any of regularities, repetitions, similarities and principles in an amount of image signals, the pattern being generated from any of the recognized regularities, repetitions, similarities and principles.

4. The method of claim 1, the characteristic comprising a barcode, particularly a data-matrix code.

5. The method of claim 1, the characteristic being embedded into the image signals as a steganographic element.

6. The method of claim 1, wherein, if the recognized pattern corresponds to the reference pattern, a first check sum is generated on the basis of the entered input value and a second check sum is generated based on the recognized pattern, said check sums being compared to each other.

7. The method of claim 1, wherein the image signals comprise control signals for accessing pixel elements of the display unit and the pattern recognition is applied to the control signals.

8. The method of claim 7, the computer retrieving corresponding status values of the pixel elements from the control signals, the pattern recognition being carried out on the status values.

9. A device for operating a computer system comprising a computer and a display unit, the computer comprising a graphic editor generating a computer program executable upon compilation, the graphic editor using graphic elements of a computer language, the graphic elements representing commands, wherein the computer forms image signals for the display unit based on an input value entered into the computer and outputs the image signals to the display unit, the image signals depicting the input value on the display unit, comprising:
  a reference pattern unit for forming a reference pattern based on the input value entered into the computer, wherein the input value comprises a command in the computer language,
  a signal-detecting unit configured for detecting the image signals outputted from the computer to the display unit, wherein the image signals depict the input value comprising the command on the display unit,
  a pattern-recognition unit connected to the signal-detection unit and configured for subjecting the detected image signals to pattern recognition, and
  a comparing unit connected to the reference-pattern unit and the pattern-recognition unit and configured for comparing a pattern recognized by the pattern-recognition unit to the reference pattern to determine whether the input value depicted on the display unit corresponds to the input value fed into the computer,
  wherein if the reference pattern does not correspond to at least one such recognized pattern, a warning is issued or a security-relevant action is carried out.

10. The device of claim 9, wherein the image signals comprise information on the display unit which enable it to display the entered input value visually.

11. The device of claim 9, wherein the pattern recognition is configured to recognize any of regularities, repetitions, similarities and principles in an amount of image signals, the pattern being generated from any of the recognized regularities, repetitions, similarities and principles.

12. The device of claim 9, wherein an allocation unit is configured for allocating a characteristic to each entered input value and the reference-pattern unit is configured for forming the reference pattern based on the input value with their assigned characteristics.

13. The device of claim 12, wherein a check-sum generator is provided for forming a first check sum based on the entered input value and for forming a second check sum based on the recognized pattern if the recognized pattern corresponds to the reference pattern, and wherein a further comparing unit is provided for comparing the first check sum to the second check sum.

14. The device of claim 9, being connected to a computer system having a computer and a display unit.

15. The device of claim 14, wherein the image signals comprise control signals for accessing pixel elements of the display unit and the pattern-recognition unit is configured to apply pattern recognition to the control signals.

16. The device of claim 14, wherein the signal-detection unit connected to the pattern-recognition unit for detecting image signals is arranged between the image-signal output of an image-signal generator of the computer and an image-signal input of the display unit.

17. A graphic editor comprising:
  input values being available on a computer in the form of graphic elements of a computer language, the graphic elements representing commands, a computer program executable upon compilation being devised using the graphic elements representing commands;
  at least a reference pattern being configured on the basis of the input values in the form of the graphic elements representing the commands;
  image signals formed on the basis of the input values, so that the input values are visually displayed on a display unit in the form of the graphic elements representing the commands, said image signals being subjected to pattern recognition to provide a recognized pattern; and
  a comparison unit configured for comparing the reference pattern and the recognized pattern to determine whether the input values visually displayed on the display unit corresponds to the input values available on the computer;
  wherein if the reference pattern does not correspond to at least one such recognized pattern, a warning is issued or a security-relevant action is carried out.

18. The graphic editor of claim 17, further comprising:
  a first check sum based on the input values;
  a second check sum based on the recognized pattern; and
  a further comparing unit for examining whether the first and second check sums correspond to each other.

19. The graphic editor of claim 18, comprising a memory for storing the first and second check sums, the first and second check sums being transmitted to the further comparing unit.

* * * * *